United States Patent

[11] 3,622,242

[72] Inventors: Edwin H. Land;
Alfred H. Bellows, both of Cambridge, Mass.
[21] Appl. No. 830,266
[22] Filed June 4, 1969
[45] Patented Nov. 23, 1971
[73] Assignee Polaroid Corporation
Cambridge, Mass.

[54] STEREOSCOPIC RANGEFINDER WITH MOVABLE RETICLES
2 Claims, 7 Drawing Figs.

[52] U.S. Cl. .................................................. 356/12, 95/44 C
[51] Int. Cl. .................................................. G01c 3/14
[50] Field of Search ...................................... 356/8, 12, 13; 95/44 C

[56] References Cited
UNITED STATES PATENTS
1,985,067 12/1934 Wandersleb ................. 356/12
1,987,765 1/1955 Wandersleb ................. 356/12

FOREIGN PATENTS
169,036 10/1959 Sweden

Primary Examiner—Ronald L. Wibert
Assistant Examiner—Orville B. Chew, II
Attorneys—Brown and Mikulka, William D. Roberson and James L. Neal ABSTRACT: A binocular rangefinder defines a field of view and superimposes thereon a composite stereoscopic virtual image of a pair of dissimilar, stereoscopically related reticles, the image having depthwise extension along a line of sight extending from the observer into the field of view. The apparent position of the image along the line of sight is variable and ranging information is obtainable concerning subjects within the field appearing between far and near limits established by the depthwise extension of the image.

PATENTED NOV 23 1971

INVENTORS
EDWIN H. LAND
and
BY  ALFRED H. BELLOWS
Brown and Mikulka
and
James L. Neal
ATTORNEYS INVENTORS
EDWIN H. LAND
and
ALFRED H. BELLOWS
BY Brown and Mikulka
and
James L. Neal
ATTORNEYS 3,622,242

1

STEREOSCOPIC RANGEFINDER WITH MOVABLE RETICLES

SUMMARY OF THE INVENTION

According to this invention a binocular rangefinder includes a pair of dissimilar, stereoscopically related reticles, means for permitting inspection of a field of view by both the left and right eyes of an observer and means for superimposing a virtual image of each of the reticles upon the field of view so that a left image is observable by the left eye while a right image is observable by the right eye. The composite image of the stereoscopic reticles appears to occupy a definite locus within the field of view toward which the eyes of the observer converge. Means are provided to adjust the relative positions of reticles to shift the apparent locus of the composite image.

The stereoscopic image is viewed in relief. That is, it is characterized by perceivable depth along a line of sight extending from the observer into the field of view. The depthwise extension may be calibrated so that apparently far and near portions of the image establish far and near limits for defining a depth of field. During ranging operation, the locus of ocular convergence, where the stereoscopic image appears to be located, is made to vary causing the virtual image to seemingly advance and recede in the field of view until the far and near portions thereof are located in a predetermined position relative to selected objects in the field of view. Ranging information is keyed to subjects appearing to be located in the area between the far and near limits, as indicated by the virtual images, instead of being keyed to subjects at a single point.

The rangefinder of this invention is particularly useful in conjunction with a variable focus photographic camera. In this application means for causing variation in the locus of ocular convergence at which the stereoscopic virtual image is observable is coordinated with means for variably focusing the camera so that the composite stereoscopic virtual image appears to advance or recede within the field of view as the camera is focused on subjects closer or further away. In a preferred embodiment of the invention the reticles are calibrated so that far and near extremities of the stereoscopic virtual image represent far and near limits defining a depth of field. The stereoscopic rangefinder and camera are calibrated and coupled together so that subjects which seem to be between the stereoscopic limits are within a range of distances at which their images in the camera have acceptable focus.

Means are provided for varying the focus of the reticles in accordance with changes in their apparent locus of convergence so that the composite stereoscopic virtual image remains in focus as its position within the field of view changes.

It is a primary object of this invention to provide, in a rangefinder, means for superimposing an adjustable stereoscopic virtual image from stereoscopically related reticles on a field of view.

It is also an object to provide in a rangefinder having stereoscopically related reticles, means for superimposing a stereoscopic virtual image of the reticles on a field of view and means for causing variation in the locus of ocular convergence at which the virtual image appears to be so the image may be made to advance and recede in the field of view.

It is a further object of this invention to provide a variable focus photographic camera having a rangefinder which superimposes a stereoscopic virtual image upon a field of view and causes the apparent position of the virtual image to advance and recede in the field to designate those objects in the scene upon which the camera is focused.

DETAILED DESCRIPTION OF THE DRAWINGS

Figure 1:
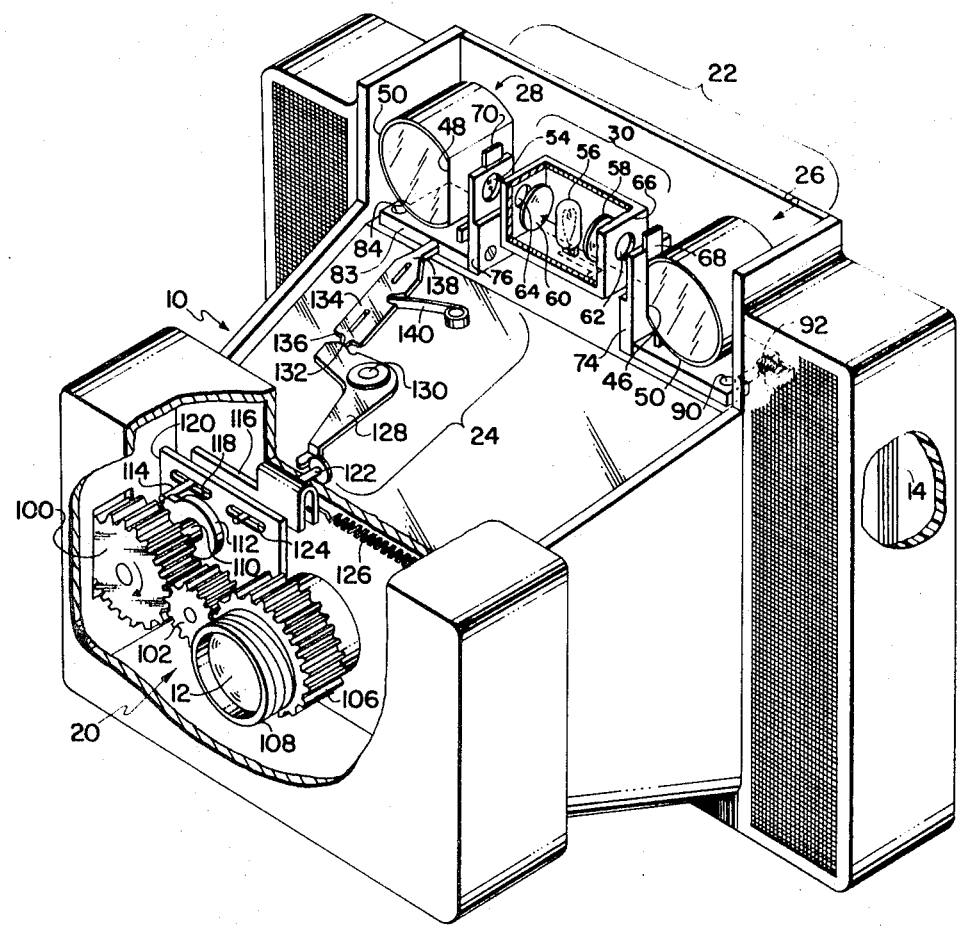
FIG. 1 is a perspective view showing a preferred embodiment of the rangefinder of this invention installed upon a photographic camera.

The preferred embodiment of rangefinder of this invention is shown in FIG. 1 where it is incorporated into a variable focus camera and linked to its focusing mechanism.

The photographic camera 10 includes an objective lens 12 to form an image on the film plane 14 where a photosensitive sheet material is placed to record the light admitted by the shutter assembly, not shown. The shutter may be located between the lens 12 and the film plane 14 and can have any standard construction providing an exposure interval of controlled duration. The camera 10 has means 20 to adjust the focus of the camera, by moving lens 12, which is linked, by means 24, to the rangefinder 22. Thus movement of means 20 to change the focal setting of lens 12 is transmitted to rangefinder 22, through linking means 24, causing the apparent locus of the stereoscopic rangefinder image to change in correspondence to the new focal setting.

Figure 2:
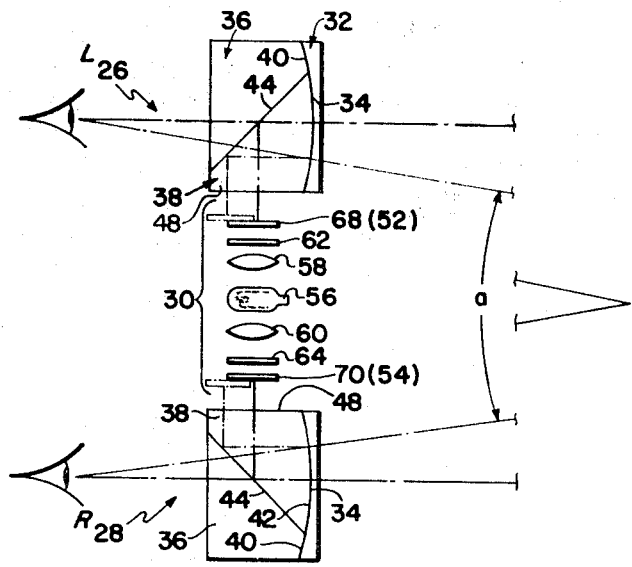
FIG. 2 is a schematic view illustrating the rangefinder of the apparatus shown in FIG. 1.

Rangefinder 22 is enclosed by a housing, not shown, and comprises left eyepiece 26, right eyepiece 28 and reticle means 30. As seen in FIG. 2, each of the eyepieces comprises front optical element 32 defining rearwardly directed concave, partially reflective surface 34. The optical axis of each concave, partially reflecting surface is aligned substantially parallel to the optical axis of objective lens 12 when the camera is conditioned for producing photographic exposures. A pair of transparent elements 36 and 38, form the rear of each of the eyepieces 26 and 28. These elements include forwardly directed convex surfaces 40 and 42, each of which conform to the shape of the concave surface 34 defined by front optical element 32. Elements 36 and 38 have an interface 44 which intersects the optical axis of the associated concave partially reflecting surface 34 at an oblique angle. Each interface 44 is silvered to form a partially reflecting plane mirror 44. The partial mirror 44 intersects their respective optical axes at 45° angles. The planes in which the partial mirrors 44 lie intersect on the observers' side of the eyepieces 26 and 28.

Illuminated reticle means 30 is located in the space between the eyepieces 26 and 28. Light from the reticle means 30 is projected through flat window 48 to the partial mirror 44 and is reflected forward toward the concave partial mirror 34. The concave mirror 34 focuses and reflects back to the eye position, through the mirror 44, a portion of the light from the reticle thereby forming a virtual image of the reticle superimposed on the observer's field of view.

Optical elements 32, 36 and 38 are assembled in the appropriate optical relationship by any convenient manner as, for example, by a transparent optical cement serving to adhere the pieces to each other. The eyepieces 26 and 28 are made in the form of cylindrical solids each having a flat window surface 48 to admit light from the reticle means 30. The cylindrical sides of each eyepieces 26 and 28 are covered by opaque shields 50 shown in FIG. 4, except in the area defined by their windows 48. The construction described above permits light from a forwardly located scene to enter the forward portion of the eyepiece and pass through to the eye of an observer located behind the eyepiece.

Illuminated reticle means 30, located between the eyepieces, contains a pair of opaque plates 68 and 70. The plates 68 and 70 each have dissimilar apertures configured as stereoscopically related reticles 52 and 54 representing left and right perspective views of a three-dimensional image extended in space along a line of sight through the rangefinder. The reticle means 30 also includes lamp 56, condensing lenses 58 and 60, diffusers 62 and 64 and housing 66 for enclosing the supporting the lamp, lenses and the diffusers.

The lamp 56 is located between the eyepieces with the condensing lenses 58 and 60 and the diffusers 62 and 64 arranged symmetrically about the lamp 56 and between the reticles 52 and 54 so as to diffusely illuminate the reticle apertures. The reticles 56 and 54 are located opposite the eyepiece windows 48 at an optical distance from concave mirror 34 less than the focal length of mirror 34.

Lamp 56 is electrically connected to source of electrical energy 63 through circuit 65 and switch 67.

Light from the diffusely illuminated reticle apertures 52 and 54 of reticle means 30 enters the eyepieces 26 and 28 through the windows 48 and impinges on the partially reflecting mirror 44 which reflects it forward to the concave partial mirror 34. The concave partial mirror 34 reflects the light from the reticle apertures backwards through the partial mirror 44 to the observer. The concave partial mirror 34 forms a virtual image of the reticle aperture, using the light from the reticle aperture because the reticle aperture is an optical distance from the concave mirror 34 less than its focal length. The observer perceives this image to be located some distance forward of the eyepiece.

The observer sees two different virtual images, one in the right eye the other in the left eye, which are noncongruent, but stereoscopically related, because the left reticle 52 has been intentionally configured differently from the right reticle 54. The reticles 52 and 54 represent the left and right perspectives of a three-dimensional subject as viewed with binocular vision.

The observer looking into the eyepieces 26 and 28 can see through them to view the scene in front, because the mirrors 44 and 34 are partially transmitting.

Visual perception of two slightly different images is normal for the nervous system which automatically rotates the eyes in their sockets so that the separate images of the observer's point of interest in his two fields of view are superimposed in his mind. The images of objects in the visual fields separated some distance from the point of interest do not register properly, but the nervous system is trained to suppress this inconsistency normally. The nervous system, by training, interprets the degree of eye rotation necessary to fuse (register) the images of the points of interest as a measurement of the distance to the point of interest. Stated in another form; the nervous system fuses the image of an object located at the locus where the optic axes of the eyes intersect and the angular relationship of the eyes simultaneously sensed by the nervous system is interpreted as a measurement of the distance to the locus.

Looking through the rangefinder of this invention the observer has two subjects of interest, the one he wishes to know the range to and the two noncongruent reticle images. The ocular convergence angle required to fuse the subject is constant, but the ocular convergence angle necessary to fuse the reticle images can be varied by mechanical means, described below, which move the reticles relative to mirrors 34. The observer cannot comfortably concentrate on both the subject and the composite reticle image simultaneously unless the ocular convergence angle is substantially the same for both. By using the mechanical means provided, the observer can change the ocular convergence angle for reticles until it matches that for the subject to be ranged on.

The noncongruent reticles intended for the preferred embodiment are intentionally configured so that their images give the observer a strong sense of depth when they are fused by eyeball rotation. One portion of the fused image appears to be markedly close to the observer than the other. In use the observer would bracket the subject with the rangefinder reticle images by ranging on the subject until it seemed to be between the extremes of the reticle image.

This sense of depth imparted to the viewfinder image by the proper design of the reticle is quite useful in photographic cameras. Photographic cameras and other optical devices do not possess a unique focal point but rather a range of distances for each focal distance setting which result in acceptable results, i.e. focal depth. When it is known what lens the rangefinder is to be used with the reticles can be configured so that the near and far extremes of the composite stereoscopic reticle image coincides with the limits on the lens' depth of focus indicating the same to the observer.

The composite stereoscopic virtual image is seen in relief. That is, it appears to have depth defining portions apparently near and far relative to the observer. The apparent spatial separation of these portions represent near and far limits along an axial extension from the observer into the field of view, the extension defining a space at a zone about which ranging information is given. Stated differently, the near and far portions of the virtual image appear to bracket selected subject matter along a depthwise extension within the field of view, the subject matter being that about which ranging information is to be obtained.

In the context of camera 10, the composite stereoscopic virtual image is three-dimensional and superimposed upon the field of view. Its apparent distance from the camera along the optical axis is varied as the lens of camera 10 is focused to cause the zone between far and near portions to designate subjects along the optical axis of the camera upon which the camera lens is acceptably focused. For example, when focusing the camera lens upon a relatively far subject, the ocular convergence angle to any point within the apparent locus of the stereoscopic image is made to decrease and the composite reticle image appears to recede from the observer. Change in convergence angle also occasions a proportional change in the apparent size of the image and therefore in the apparent spatial separation of near and far portions of the image. The change in apparent separation is proportional to the change in depth of field necessarily occuring as the camera is focused upon subject matter at varying distances from the camera.

Increase in ocular convergence angle attends focus adjustment from a relatively far subject to a near one and causes a decrease in the apparent spatial separation of the near and far portions of the image as it advances toward the observer. Simultaneous decrease in the depth of field results from the camera being focused upon a relatively near subject. Similarly, decrease in ocular convergence attending focus adjustment to a relatively far subject from a near one causes increase in the apparent spatial separation of near and far portions of the image as it recedes from the observer, the increase being proportional to simultaneous increase in depth of field occasioned by the camera being focused upon a relatively far subject.

The stereoscopically related reticles 52 and 54 may be configured so that the composite stereoscopic virtual image resulting therefrom delineates a pair of arrows superimposed upon the field of view, one of the arrows appearing forward of the other, the space existing between the arrows defining the zone about which ranging information is obtainable.

Figure 3A:
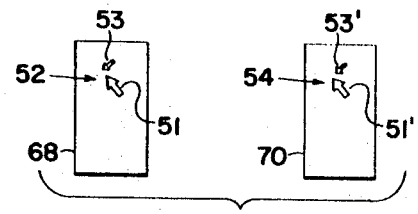
FIGS. 3a through 3c illustrate various embodiments of stereoscopically related reticles usable in the rangefinder of FIG. 1.

FIG. 3a illustrates such reticles. Opaque plates 68 and 70 define apertures of the desired reticular configuration. In left reticle 52, small arrow 53 is left of large arrow 51. In right reticle 54, small arrow 53' is right of large arrow 51'. When reticles 52 and 54 are viewed stereoscopically in the apparatus of FIG. 2, a composite stereoscopic image is apparent, the large arrow forming the near portion of the composite image and the small arrow the far portion of the composite image.

Figure 3B:
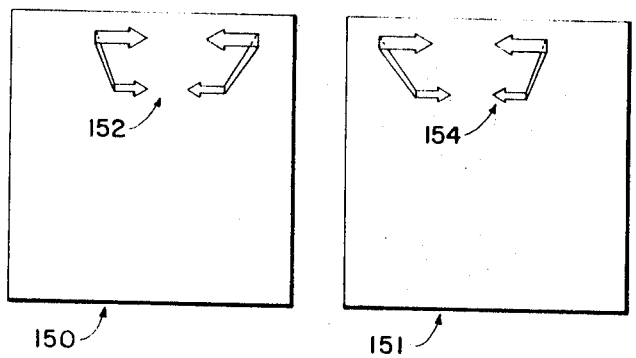

Other reticles suitable for use with this invention are illustrated in FIG. 3b. Left and right reticle forming means 150 and 151 each comprise a transparent sheet having an opaque coating thereon. The opaque coating is scribed to delineate transparent stereoscopically related left and right reticles 152 and 154, respectively. The reticles, when viewed stereoscopically in the apparatus of FIG. 2, produce a composite stereoscopic virtual image in superposition upon the field of view. The stereoscopic image appears as two pairs of arrows, the arrows of each pair being separated in space and joined by a horizontal beam. The large and small arrows of each pair appear to point toward the large and small arrows, respectively, of the other pair. The large arrows form the portion of the composite image apparently nearest the observer and designate the nearest subjects in acceptable focus and the small arrows form the portion of the composite image apparently farthest from the observer and designate the farthest subjects in acceptable focus. In this manner, the composite stereoscopic image appears to bracket and enclose selected subjects when such subjects are within acceptable focus.

Figure 3C:
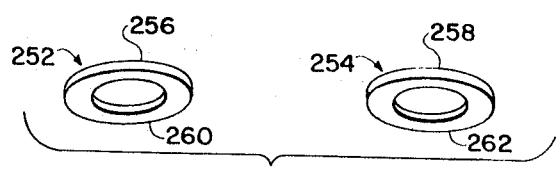

The reticles may be configured to define a composite virtual image of any desired configuration. The composite image need not consist of two separate parts. For example, a single three-dimensional composite virtual image may be defined wherein far and near portions of the composite image define far and near portions of the zone concerning which ranging information is to be given. FIG. 3c shows stereoscopically related reticular configurations consisting of left reticle 252 and right reticle 254 for producing a composite stereoscopic virtual image of a circle lying in substantially a horizontal plane. Portions 256 and 258 of reticles 252 and 254, respectively, form the portion of the composite image apparently nearest the observer and designate the near limit of subjects in acceptable focus. Portions 260 and 262 of such reticles form the portion of the composite image apparently farthest from the observer and designate the far limit of subjects in acceptable focus. In this reticular configuration, the virtual image appears as a halo above the subject matter upon which the camera is focused.

The reticles could also be configured to delineate a composite stereoscopic virtual image of a field defining frame characterized by portions appearing relatively far from and relatively near the observer.

It should be noted that apparent size of an image in a field of view is a factor influencing depth perception. Accordingly, the reticle configurations represented in FIGS. 3a and 3b define far and near arrows of differing size, the larger arrow being the one appearing near the observer as a result of the stereoscopic relationship of the reticles so as to enhance depth perception. The size relationship of the arrows can be one which will cause the observer to apparently perceive arrows of equal size spaced at different distances from the observer.

Plates 68 and 70 are movably supported by means 72 for varying the convergence angle (a) at which images of reticles 52 and 54 are observable as a stereoscopic virtual image and for varying the image focus in accordance with variation in the convergence angle. Means 72 varies the angles at which the real images of reticles 52 and 54 are directed toward the aforesaid plane mirrors 44 and thereby varies the convergence angle at which the composite stereoscopic image is observable, as illustrated in FIG. 2.

Figure 4:
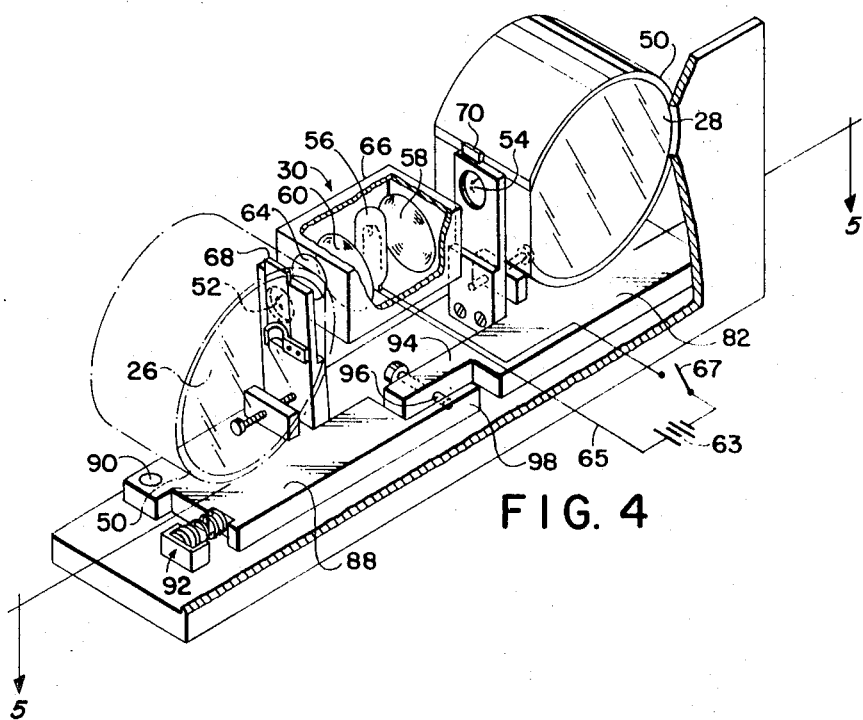
FIG. 4 is a perspective view showing the rangefinder of FIG. 1.
Figure 5:
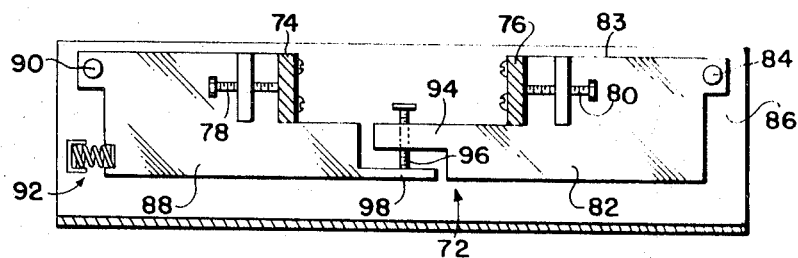
FIG. 5 is a sectional view taken along line 5—5 of FIG. 4.

Means 72 is illustrated in FIGS. 4 and 5 and comprises upstanding supports 74 and 76 for plates 68 and 70, respectively. The precise operating position of plates 68 and 70 relative to plates 88 and 82 may be determined by means of adjustment screws 78 and 80. Support 76 extends from plate 88 which is pivotally mounted by pin 84 to base 86. Support 74 extends from plate 88 which is pivotally mounted by pin 90 to base 86. Plate 82 includes extension 94 which supports a contact point 96, which contact point, in the preferred embodiment, takes the form of a screw so that the system may be adjustable. Plate 88 includes extension 98 for cooperation with contact point 96.

Plate 82 defines surface 83 adapted to receive an input force producing counterclockwise rotation of plate 82 about pin 84. Plate 88 is biased for counterclockwise movement about pin 90 by spring means 92. Application of the input force rotates plate 82 counterclockwise and, by means of the contact point, causes plate 88 to rotate clockwise, rotation of both plates occuring in opposition to the bias of spring means 92.

Since plates 82 and 88 are pivoted, a compound motion of reticles 52 and 54 occurs. See FIG. 2. One component is a back and forth motion, parallel to the optical axes of mirrors 34 and the other component is a motion normal to these optical axes. A small change in the angular orientation of reticle forming plates 68 and 70 occurs but the angular change is so small that its effect upon the position of the reticles formed by the plates is negligible.

Translation of the reticle along a line parallel to the optical axis of the eyepiece controls the apparent position of its virtual image relative to the axis. In the arrangement of parts shown in FIG. 2 rearward motion of the reticles causes the ocular convergence angle to increase and the image seems to approach the observer. Movement of the reticle along a line normal to the optical axis of the eyepiece changes focal conjugate slightly resulting in a magnification change to the virtual image, as well known to those skilled in the art.

The desirability of varying reticle image magnification and focus in conjunction with variation in the convergence angle arises due to the manner in which the eye normally functions. When we see a distant object come closer, we not only converge our gaze by rotating our eyeballs within their orbits, but we also accommodate the image by contrasting the ciliary muscles surrounding the lens to accommodate the new focal distance and we expect to see the object size (magnification) change. In the normal eye, these functions are coupled together. Thus, in the binocular rangefinder, if we place the reticle on an object a few feet away, we not only expect its convergence to match that of the object, but we expect its focus to be the same as sensed by muscular tensions in the eye. If the focus of the reticle is fixed at infinity, the rangefinder may be psychologically difficult to use, particularly at very close distances.

The provision by which reticle image focus is varied also serves to compensate for ranging inaccuracies which tend to arise due to variation in the interocular distance of various users of the rangefinder. The potential inaccuracy and compensation thereof occur in this manner. The variable distance binocular rangefinder is adjustable for distance by making gross changes in the ocular convergence angle at which the two virtual images formed in front of each eye respectively are observable. However, this gross change is precisely correct for a preselected eye spacing only. For people with smaller or greater interocular distances there will be a ranging error unless the gross convergence angle is slightly modified. This is readily understood if the interocular distance is considered the base of a triangle having its apex at the virtual image, wherein the distance between the base and the apex is the distance being ranged. Obviously if the base is changed, the angle at the apex (i.e. the convergence angle) must change if the position of the apex is to remain fixed. This fine compensation in the convergence angle is proportional to the person's deviation from a preselected eye spacing and inversely proportional to the apparent distance to the virtual image. The method of accomplishing this compensation is to move the reticle so that rays from the reticle diverge in such a way that users with different interocular distances pick up rays with different and corresponding ocular convergence angles. This divergence of the rays from the reticle corresponds exactly to a virtual image which has been focused for the same distance at which the gross convergence angle is set. Thus, if both convergence and focus of the virtual image are adjusted in concert, variations in eye spacing will not result in any ranging error.

As aforesaid, the rangefinder installed upon photographic camera 10 also includes focusing means 20 and motion transmitting means 24.

Focusing means 20 includes a large gear 100 mounted on the front of the shutter housing so as to be manually engageable, coupled through idler gears 102 to a gear 106 secured around lens mounting barrel 108. Large gear 100 is keyed to a shaft 110 which rotatably supports the gear. Rotation of lens barrel 108 produces focusing movement of the lens in a manner well known in the art.

Motion transmitting means 24 includes cam 112 mounted upon shaft 110 for rotation therewith and engaged with a follower 114. Follower 114 is mounted on link 116 near one end of the link and slideable along slot 118 in plate 120. Pin 122 is mounted in link 116 near the opposite end thereof and is engaged by slot 124 in plate 120 for sliding movement therein.

Spring 126 is provided for retaining follower 114 against cam 112. One end of pin 122 projects rearwardly for engagement with bell crank lever 128. Bell crank lever 128 is mounted for pivotal movement by pin 130 and includes cam surface 132 adjacent the end thereof opposite that engageable by pin 122. Cam 132 engages link 134 mounted for linear movement toward and away from rangefinder 22. Link 134 includes follower surface 136 engageable with cam surface 132 and elongated projection 138 which abuts surface 83 of plate 82 within the rangefinder for supplying the aforementioned input force. Cantilever spring 140 is provided for urging link 134 into engagement with lever 128 to thereby urge lever 128 into engagement with pin 122. Spring 140 and spring 126 both serve to urge follower 114 against cam 112.

OPERATION OF THE RANGEFINDER WITH A PHOTOGRAPHIC CAMERA

The camera is directed toward the scene to be photographed and the scene is viewed in binocular fashion through the rangefinder eyepieces. The left eye views the scene through left eyepiece 26 and the right eye views the scene through right eyepiece 28.

Switch 67 is closed to energize lamp 56 and light from the lamp passes through collimating lenses 58 and 60, through diffusers 62 and 64 and falls upon reticle forming plates 68 and 70. Plates 68 and 70 block all illumination, except that passing through openings therein which form the stereoscopically related reticles 52 and 54. The reticles cause an imagewise distribution of light in the configuration of the reticles to pass to the flattened surfaces of the eyepieces. The light passing to flattened surface 46 of the eyepiece 26 is in the configuration of left reticle 52 and the light passing to the flattened surface 48 of eyepiece 28 is in the configuration of right reticle 54. In this manner, the imagewise distribution of light from the reticles strikes plane mirrors 44 in the eyepieces, is reflected forward to concave mirrors 34 and is then focused and reflected back to the eye positions located rearwardly of the eyepieces as aforesaid. A virtual image of the left eye reticle is thus superimposed upon the field of view for observation by the left eye while a virtual image of the dissimilar right eye reticle is superimposed upon the field of view, for observation by the right eye. When the camera is focused at infinity, the ocular convergence angle is substantially 0°. The line of sight through each of the eyepieces is thus substantially parallel with the optical axis of the camera and the apparent position of the composite stereoscopic image in the field of view will be at infinity. As the camera is focused upon a near subject, the convergence angle is caused to increase and the apparent position in the field of view of the virtual image will advance toward the observer, to the position of the near subject.

For example, when ranging from a relatively far subject to a relatively near subject, the reticles are shifted substantially parallel to the optical axis of the eyepieces toward the observer while simultaneously being moved while transverse to the optical axis of the eyepieces, toward plane mirror 44. The aforesaid axial movement reduces the convergence angle to thereby cause the composite stereoscopic virtual image to advance toward the observer in the field of view. The aforesaid movement transverse to the optical axis reduces the optical path length between the reticle to the concave imaging mirror 34 and thereby causes the virtual image to be focused relatively near the camera. These axial and transverse movements are coordinated such that the point of conversion and the point of focus always coincide.

During focusing of the camera, means 24 transmits movement from the focusing means 20 to rangefinder 22 for moving reticles 52 and 54. Large gear 100 is manually manipulated so that rotation is transmitted through gears 102 to gear 106 around lens mounting barrel 108 to cause objective lens 12 to move along its optical axis in a manner bringing various subjects in the field of view into focus according to the distance between the subjects and the camera. Cam 112 repositions follower 114 and thereby causes movement to be transmitted by link 116, lever 128 and link 134 to surface 83 for effecting movement of the reticles relative to the eyepieces. As gear 100 is rotated in the direction of the arrow illustrated thereon, objective lens 12 recedes from a position relatively near the subject to a position relatively far from the subject for focusing upon subjects relatively far from the camera and, ultimately, at infinity. As this movement takes place, cam 112 also rotates in the direction of the arrow to permit follower 114 to move according to the bias of spring means 126. Link 134 and lever 128 follow pin 122 under the influence of spring means 140. Movement of link 134 permits plates 82 and 88 to move, under the influence of spring means 92, clockwise and counterclockwise respectively. This advances the reticles forward and away from the eyepieces whereby the convergence angle decreases and the composite stereoscopic virtual image recedes from the observer, remaining in focus, and may finally appear at infinity, in focus at infinity. Conversely, when gear 100 is rotated in the direction opposite that indicated by the arrow, lens 12 is advanced in a manner appropriate for focusing upon subjects relatively near the camera and cam 112 drives follower 114, and thus link 116, against the bias of spring means 126. Pin 122 then advances crank 128 and link 134 against the bias of spring 140 to rotate plates 82 and 88 for advancing reticles 52 and 54 in the rearward direction parallel to the optical axes of eyepieces 26 and 28 toward the eye position at the rear of the camera and transverse to the optical axes of eyepieces 26 and 28 toward flattened portions 48 of eyepieces 26 and 28. Thereby, the convergence angle increases and the composite stereoscopic virtual image advances in the field of view, remaining in focus and changing magnification and may finally appear very near the observer, for example ten inches forward of the objective lens.

The depth of field, which is the distance between the nearest and farthest points in acceptable focus, increases and decreases in proportion to increase and decrease respectively, of the distance between the camera and subjects upon which it is focused. As explained above, the apparent distance between far and near portions of the composite stereoscopic image superimposed upon the field increases and decreases with increase and decrease in the apparent distance between the image and the camera.

The operation of the focusing means 20, means 24 and rangefinder 22 is coordinated to cause the composite stereoscopic virtual image to appear superimposed upon selected subjects in a field of view upon which the camera is focused, the near and far portions of the composite image appearing to bracket all subject matter upon which the camera is acceptably focused. Therefore, the camera shutter may be operated to produce a photographic exposure and all subjects apparently bracketed between far and near portions of the stereoscopic virtual image will be in focus.

It should now be apparent that his invention provides a rangefinder capable of giving ranging information with reference to a zone between far and near limits in a field of view. Further, when embodied in a photographic camera, the rangefinder of this invention is capable of establishing a zone of acceptable focus to identify for the photographer subjects within the field of view for which the camera is acceptably focused.

It should be understood that terms "counterclockwise", "clockwise", "front", "rear" and the like are used only for purposes of discussion in connection with the drawings.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. A stereoscopic rangefinder comprising:
   left viewing means for permitting the inspection of a field of view;

right viewing means for permitting the inspection of said field of view;

a left reticle and a right reticle, said reticles being stereoscopically related, but dissimilar, representations of a three-dimensional indicia extending along a line of sight, said reticles being positioned between said left and right viewing means, said left reticle proximate said left viewing means and said right reticle proximate said right viewing means;

means, between said reticles, for illuminating said reticles;

reflective means, associated with said left viewing means, for forming a virtual image of said left reticle and for superimposing it on said field of view;

reflective means, associated with said right viewing means, for forming a virtual image of said right reticle and for superimposing it on said field of view; and adjusting means for simultaneously moving said reticles in arcuate paths to vary the ocular convergence angle required of an observer to fuse said virtual images, and for simultaneously changing the distance between said reticles and said reflective means whereby the focus of said virtual images is varied to correspond with variations in said ocular convergence angle.

2. The stereoscopic rangefinder of claim 1 wherein said adjusting means comprises:

a left lever, supporting said left reticle, pivoting about a bearing located to the left of said left reticle;

a right lever, supporting said right reticle, pivoting about a bearing located to the right of said right reticle;

spring means for urging one of said levers into contact with the other of said levers at a point intermediate said reticles; and actuating means bearing on a second of said levers for causing both said levers to pivot about said bearings so as to alter the ocular convergence angle required to fuse said virtual images, and for altering the focus of said virtual images in correspondence with variations in said ocular convergence angle.

* * * * *